(12) United States Patent
Angelova et al.

(10) Patent No.: US 10,646,831 B2
(45) Date of Patent: May 12, 2020

(54) METHOD FOR MANUFACTURING OF A CARBON NANOMEMBRANE

(71) Applicant: CNM Technologies GmbH, Bielefeld (DE)

(72) Inventors: Polina Angelova, Bielefeld (DE); Albert Schnieders, Bielefeld (DE)

(73) Assignee: CNM Technologies GmbH, Bielefeld (DE)

( * ) Notice: Subject to any disclaimer, the term of this patent is extended or adjusted under 35 U.S.C. 154(b) by 3 days.

(21) Appl. No.: 15/961,145

(22) Filed: Apr. 24, 2018

(65) Prior Publication Data

US 2018/0236410 A1    Aug. 23, 2018

Related U.S. Application Data

(63) Continuation-in-part of application No. PCT/EP2016/076016, filed on Oct. 28, 2016.

(30) Foreign Application Priority Data

Oct. 28, 2015  (DE) .................. 10 2015 118 412

(51) Int. Cl.
*B01D 53/22* (2006.01)
*B01D 69/12* (2006.01)
(Continued)

(52) U.S. Cl.
CPC ....... *B01D 69/122* (2013.01); *B01D 67/0006* (2013.01); *B01D 67/0088* (2013.01);
(Continued)

(58) Field of Classification Search
CPC ............... B01D 69/10; B01D 2323/30; B01D 67/0088; B01D 69/122; B01D 2323/39;
(Continued)

(56) References Cited

U.S. PATENT DOCUMENTS 3,119,358 A * 1/1964 Colson .................. E04H 9/06
                                                              109/1 S
3,143,364 A * 8/1964 Klein ..................... B32B 15/08
                                                              285/55
(Continued)

FOREIGN PATENT DOCUMENTS

DE    10 2007 041 820 A    3/2009
DE    10 2008 046 707 A    3/2010
(Continued)

OTHER PUBLICATIONS

Zhang et al., "Vibrational modes of ultrathin carbon nanomembrane mechanical resonators," Appl. Phys. Lett. 106, 063107 (Feb. 2015).
(Continued)

*Primary Examiner* — Anthony R Shumate
(74) *Attorney, Agent, or Firm* — 24IP Law Group USA, PLLC; Timothy Dewitt

(57) ABSTRACT

A method for the manufacture of a carbon nanomembrane is disclosed. The method comprises preparing a metallised polymer substrate and applying on the metallised polymer substrate a monolayer prepared from an aromatic molecule. The aromatic molecule is cross-linked to form a carbon nanomembrane. The carbon nanomembrane is coated by a protective layer and subsequently the carbon nanomembrane and the protective layer are released from the metallised polymer substrate. Finally, the carbon nanomembrane and the protective layer are optionally placed on a support. The protective layer can be optionally removed. The carbon nanomembrane can be used for filtration.

8 Claims, 3 Drawing Sheets

(51) Int. Cl.
*B01D 67/00* (2006.01)
*B01D 69/10* (2006.01)
*B05D 1/18* (2006.01)
*B01D 71/02* (2006.01)
*B82Y 40/00* (2011.01)

(52) U.S. Cl.
CPC ........... *B01D 69/10* (2013.01); *B01D 71/021* (2013.01); *B05D 1/185* (2013.01); *B82Y 40/00* (2013.01); *B01D 2323/30* (2013.01); *B01D 2323/34* (2013.01); *B01D 2323/39* (2013.01); *B05D 2201/00* (2013.01); *B05D 2350/65* (2013.01)

(58) Field of Classification Search
CPC ............ B01D 2323/34; B01D 67/0006; B01D 71/021; B05D 2201/00; B05D 2350/65; B05D 1/185; B82Y 40/00
See application file for complete search history.

(56) References Cited

U.S. PATENT DOCUMENTS

| | | | | |
|---|---|---|---|---|
| 3,380,974 | A * | 4/1968 | Stilmar | B32B 15/08 428/421 |
| 3,653,891 | A * | 4/1972 | Thourson | G03G 15/04018 430/48 |
| 5,728,431 | A | 3/1998 | Bergbreiter et al. | |
| 6,468,657 | B1 | 10/2002 | Hou et al. | |
| 6,764,758 | B1 | 7/2004 | Grunze et al. | |
| 9,735,366 | B2 * | 8/2017 | Turchanin | H01L 51/0045 |
| 2011/0092726 | A1 * | 4/2011 | Clarke | C12M 21/02 554/175 |
| 2011/0159343 | A1 * | 6/2011 | Yamada | B01D 67/0009 429/129 |
| 2011/0189430 | A1 * | 8/2011 | Cook | B29C 65/00 428/116 |
| 2014/0167329 | A1 * | 6/2014 | L'Abee | D01D 5/0007 264/465 |
| 2015/0040848 | A1 * | 2/2015 | McAlister | F02M 21/0206 123/1 A |
| 2016/0060790 | A1 * | 3/2016 | Park | D01D 5/0007 425/145 |

FOREIGN PATENT DOCUMENTS

| | | |
|---|---|---|
| DE | 10 2009 034 575 A | 1/2011 |
| WO | 2005_089415 A2 | 9/2005 |
| WO | 2015 197 834 A1 | 12/2015 |

OTHER PUBLICATIONS

A. Beyer et al., "Fabrication of metal patterns on freestanding graphenoid nanomembranes," J. Vac. Sci. Technol. B 28, C6D5 (2010).
A. Turchanin, A. Golzhauser, "Carbon nanomembranes from self-assembled monolayers Functional surfaces without bulk," Progress in Surface Science 87, pp. 108-162 (2012).
C.T. Nottbohm et al., "Direct e-beam writing of 1 nm thin carbon nanoribbons," J. Vac. Sci. Technol. B 27, pp. 3059-3062 (2009).
Polina Angelova et al._ _A Universal Scheme to Convert Aromatic_ Molecular Monolayers into Functional Carbon Nanomembranes_,_ ACS Nano,_vol. 7, No. 8, Aug. 27, 2013.
Om P. Khatri, "Effects of Chain Length and Heat Treatment on the Nanotribology of AlkylsilaneMonolayers Self-Assembled on a Rough Aluminum Surface," J. Phys. Chem. B 2005.
Yildirim, "Modification of Aromatic Self-Assembled Monolayers by ElectronIrradiation: Basic Processes and Related Applications," J.Phys.Chem.C_2017.
Frey, et al., "Structure of Thioaromatic Self-Assembled Monolayers on Gold and Silver," Langmuir 2001, 17, 2408-2415.
Georg Albert, "Physikal Vapor Disposition," www.georg-albert-pvd.de, Apr. 16, 2018.
M. Ai, S. Shishatskiy, J. Wind, X. Zhang, C.T. Nottbohm, N. Mellech, A. Winter, H. Vieker, J. Qiu, K-J. Dietz, A. Goelzhaeuser, A. Beyer, "Carbon Nanomembranes (CNMs) Supported by Polymer: Mechanics and Gas Permeation," Adv. Mater. 2014, 26, 3421-3426.

* cited by examiner

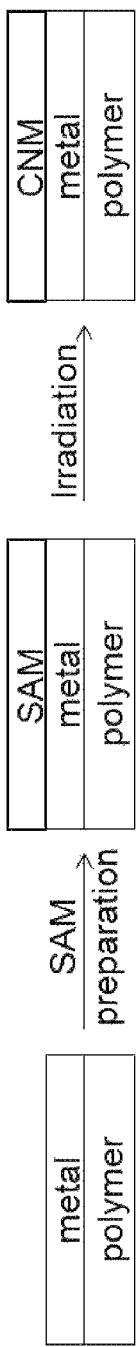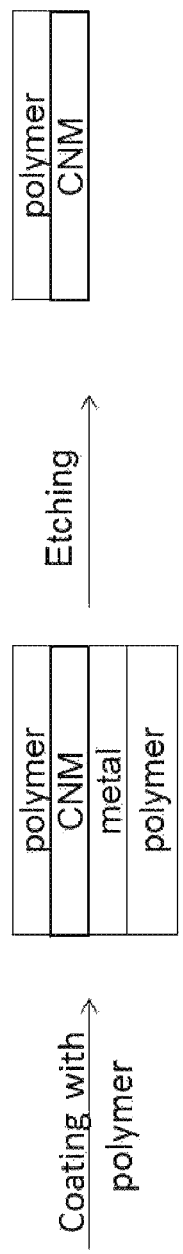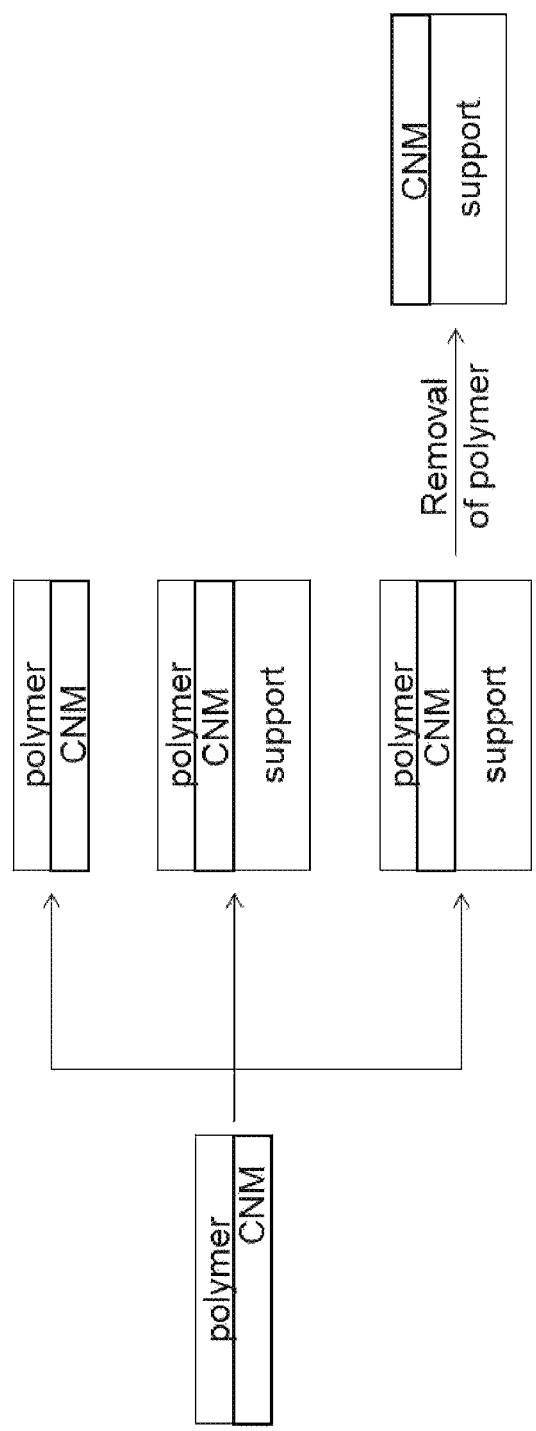
Fig. 4A
Fig. 4B
Fig. 4C

METHOD FOR MANUFACTURING OF A CARBON NANOMEMBRANE

CROSS-REFERENCE TO RELATED APPLICATIONS

This application is a continuation-in-part application of International Patent Application No. PCT/EP2016/076016 filed on Oct. 28, 2016, which claims benefit to and priority of German Patent Application No. DE 10 2015 118 412.5, which was filed on 28 Oct. 2015. The above-referenced applications hereby are incorporated herein by reference in their entirety.

REFERENCE TO SPONSORED RESEARCH

This invention was made with German government support under grant award 03X0158B awarded by the Federal Ministry of Education and Research (BMBF).

BACKGROUND OF THE INVENTION

Field of the Invention

The invention relates to fabrication of carbon nanomembranes, which are usable for gas separation and ultrafiltration.

Brief Description of the Related Art

Currently carbon nanomembranes (CNMs) are produced on the laboratory scale. One method for the production of carbon nanomembranes is disclosed in U.S. Pat. No. 6,764,758. The production method involves the following steps: formation of a self-assembled monolayer (SAM) on a solid homogeneous substrate, crosslinking of the individual molecules in the self-assembled monolayer by irradiation to produce a carbon nanomembrane, and separation of the formed carbon nanomembrane from the original substrate. Experiments have demonstrated that the several steps of the production method and expensive substrate materials have to date hindered a large-scale production of carbon nanomembranes.

The substrates usually used for the initial formation of the self-assembled monolayer are atomically flat special substrates, e.g. gold or silver layers on cleaved mica samples, gold or silver layers on silicon wafers as for example supplied by Georg Albert PVD-Coatings, Germany, silicon nitride layers on silicon wafers, or flat copper foils. It is stated in the US '758 application that, if the surface of the substrate is atomically flat and homogeneous, i.e., has no edge dislocations or defects, then the protective (carbon nanomembrane) layer is also atomically flat, homogeneous, and defect-free, and forms a nearly perfectly smooth protective film on the substrate surface to be protected. In other words, U.S. Pat. No. 6,764,758 teaches that to form a nearly perfectly smooth protective film and substantially defect-free carbon nanomembrane on the substrate, it is necessary to use an atomically flat initial substrate. Such atomically flat initial substrates are often stiff and therefore not usable for a potential roll-to-roll production. The substrates have a high price and a limited commercial availability.

Zhang et al., Appl. Phys. Lett. 106, 063107 (2015) use, for example, 300 nm polycrystalline gold layer thermally evaporated on mica substrates (supplied by Georg Albert PVD-Coatings, Germany). Such gold layers have large, atomically flat surface domains and are favourable for the formation of well-ordered self-assembled monolayers on their surface. These types of substrates have therefore been favoured in the scientific community for studying the self-assembled monolayers. Similarly, silicon-based substrates e.g. silicon nitride membranes, such as those taught in Beyer et al. J. Vac. Sci. Technol. B 28, C6D5 (2010). are used. Yildirim et al., J. Phys. Chem. C 121, 567-576 (2017), also use expensive atomically flat substrates, as described on page 568, 1st column, second paragraph of "2. Experimental Section" in which it states that the gold substrates were prepared by thermal evaporation of 70-75 nm of gold (99.99% purity) onto polished single-crystal silicon (100) wafers (Silicon Sense). The films were polycrystalline, exposing preferably (111) oriented surfaces of individual crystallites.

One other reason for the use of such gold layers or silicon layers is that the chemistry of forming a self-assembled monolayer on the gold layer or the silicon layer is well-known.

P. Angelova et al., ACS Nano 7, 6489 (2013) confirmed that only well-ordered SAMs could cross-linked into homogenous CNMs. As stated on page 6491, 1st column, it was shown that "bulky aromatic hydrocarbons" assemble even on mostly atomically flat Au (111) substrates in less ordered monolayers and cross-link into CNMs with pores.

It is also known that thioaromatic (Biphenylthiol, Terphenylthiol and Anthracenthiol) SAMs on polycrystalline Au and Ag (predominantly exhibiting (111) orientation) form highly oriented and densely packed SAMs, as taught by Frey et al., Langmuir 17, 2408-2415 (2001).

However, Khatri et al. [J. Phys. Chem. B 109, 23405-23414 (2005)] have studied alkyltrichlorosilane SAMs on rough Al Surfaces. They found (page 23407, 2nd column, 1st paragraph) that the methylene peak frequencies of ODTS are characteristic of chains in a highly ordered, all-trans conformation; those of OTS of a liquid and those of DDTS are intermediate. ODTS stands for octadecyltrichlorosilane; DDTS stands for dodecyltrichlorosilane and OTS stands for octyltrichlorosilane. This study by Khatri and colleagues suggests that fairly long precursor molecules (in this example ODTS with a backbone of 18 carbon atoms) are necessary to form a highly ordered SAM on a rough Al surface. However, it is not possible to form a CNM from an alkyl-SAM. Therefore, the paper does not demonstrate a method for fabrication of a CNM on a rough surface.

The substrates of the prior art also need pre-treatment, which could involve, amongst other steps, cleaning from organic adsorbates using, for example, Piranha solution (sulphuric acid and hydrogen peroxide—as for example described by Beyer [A. Beyer et al. J. Vac. Sci. Technol. B 28, C6D5 (2010)), plasma treatment and/or UV/ozone treatment. In the case of the silicon nitride substrate, it is necessary to carry out full oxidation of the uppermost surface layers by using, for example, UV/ozone treatment. In the case of a copper substrate, it is necessary to remove the surface oxide, as well as flattening and recrystallization of the copper substrate by, for example, alternating sputter and annealing cycles. In the case of gold layers, a controlled amount of oxidation of the surface needs to be carried out by, for example, UV/ozone treatment (as described on p S15 in the Supplementary Information to P. Angelova et al., ACS Nano 7, 6489 (2013). These steps in the pre-treatment add to complexity and are not easily scalable for large-area production.

U.S. Pat. No. 5,728,431 teaches the production of self-assembled polymers on a metallic substrate and disclosed the self-assembly of a polymer (i.e. not a low molecular aromatic molecule) on this substrate. This substrate needs to be specially treated before layer formation. For example, claim 1 of this patent states that the metallic substrate needs to be treated by cleaning such that a reactive zerovalent metal or metal oxide layer is exposed. Further elaborate procedures of pre-treatment of the substrate are described in the examples, especially example 6 using Aluminium as substrate. The aluminium foil of example 6 was cleaned by extraction with toluene for 24 hours and then heated to 235° C. for 4 days to produce a clean surface.

The surface chemistry for the formation of a self-assembled monolayer in a solution is usually very sensitive and requires special pre-treatment of the solvents, cleaning of the reaction vessels and reaction under an inert atmosphere or in a vacuum. The pre-treatment of the solvents involves degassing and drying to ensure lowest levels of dissolved gases, such as oxygen. The cleaning of the reaction vessels includes cleaning from the adsorbates by Piranha solution. The reaction under inert atmosphere or vacuum is to ensure lowest levels of oxygen. These steps are necessary to prevent oxidation of the surface-active molecules and competing reactions between precursor molecules in the solution or precursor molecules and surface contaminants.

The prior art preparation method also requires separation of the carbon nanomembrane from the original (sacrificial) substrate and includes typically etching of the substrate involving often, at least for mica and silicon-based substrates, concentrated hydrofluoric acid, which is highly corrosive and an acute contact poison. Such processes involving hydrofluoric acids have to be handled with extreme care, using protective equipment, hoods and safety precautions beyond those used for processes involving other mineral acids.

There is therefore a requirement to develop a method for improved production of carbon nanomembranes.

It is known that large area carbon nanomembranes are usually not stable enough to be handled alone because of their thinness. Therefore, the large area carbon nanomembranes in the art are often supported by an additional layer during their separation from the substrate and the transfer to a new support structure (see also Zhang [X. Zhang, Appl. Phys. Lett. 106, 063107 (2015)]). These (sacrificial) layers are typically removed after transfer.

A universal scheme to convert aromatic molecular monolayers into functional carbon nanomembranes is known from the publication of the same name in ACS Nano, Vol. 7, No 8, 6489-6497 which describes carbon nanomembranes produced from self-assembled monolayers of 1,1'-biphenyl-4-thiol (BPT) and other aromatic sulphur-containing molecules on gold substrates. Similarly, other detailed descriptions can be found in A. Beyer et al. J. Vac. Sci. Technol. B 28, C6D5 (2010) or X. Zhang, Appl. Phys. Lett. 106, 063107 (2015).

At the date of conception of the invention, it was considered not possible to use non-atomically flat metallized polymer foils as a cheap alternative to the atomically flat surfaces known in the art, such as gold or silver layers on mica and polished single crystal silicon or silicon nitride layers on Si wafers.

SUMMARY OF THE INVENTION

The method described enables the fabrication of carbon nanomembranes on a large scale. The carbon nanomembranes are usable for gas separation or ultrafiltration.

The method for the manufacture of a carbon nanomembrane disclosed in this document comprises preparing a metallised polymer substrate and applying on the metallised polymer substrate a monolayer prepared from an aromatic molecule. The aromatic molecule is subsequently cross-linked to form a carbon nanomembrane and then protected by a protective layer. Finally, the metallised polymer substrate is removed.

The inventors have found that the metallised polymer substrate used enables the formation of the monolayer from the aromatic molecule.

In one aspect, the metal of the metallised polymer layer is aluminium, which is substantially cheaper than the previously used gold layers on mica and does not need a substantial degree of pre-treatment. Previously the person skilled in the art would not have considered the use of an aluminium layer on a polymer foil, since the body of opinion would have been to use gold or silicon-based layers as their chemistry is well-known, and the surface crystallinity and flatness should be well-controlled. It will be recalled that the prior art documents taught the formation of carbon nanomembrane on such well-controlled layers.

The polymer layer is a PET substrate, as this is a common substrate. However, other types of polymer layers could be used.

In one aspect of the invention, the pores in the carbon nanomembranes are preferably small enough to suppress the permeation of all gases.

DESCRIPTION OF THE DRAWINGS

For a more complete understanding of the present invention and the advantages thereof, reference is now made to the following description and the accompanying drawings, in which:

FIGS. 4A, 4B and 4C show diagrams of the carbon nanomembranes during the manufacturing steps

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
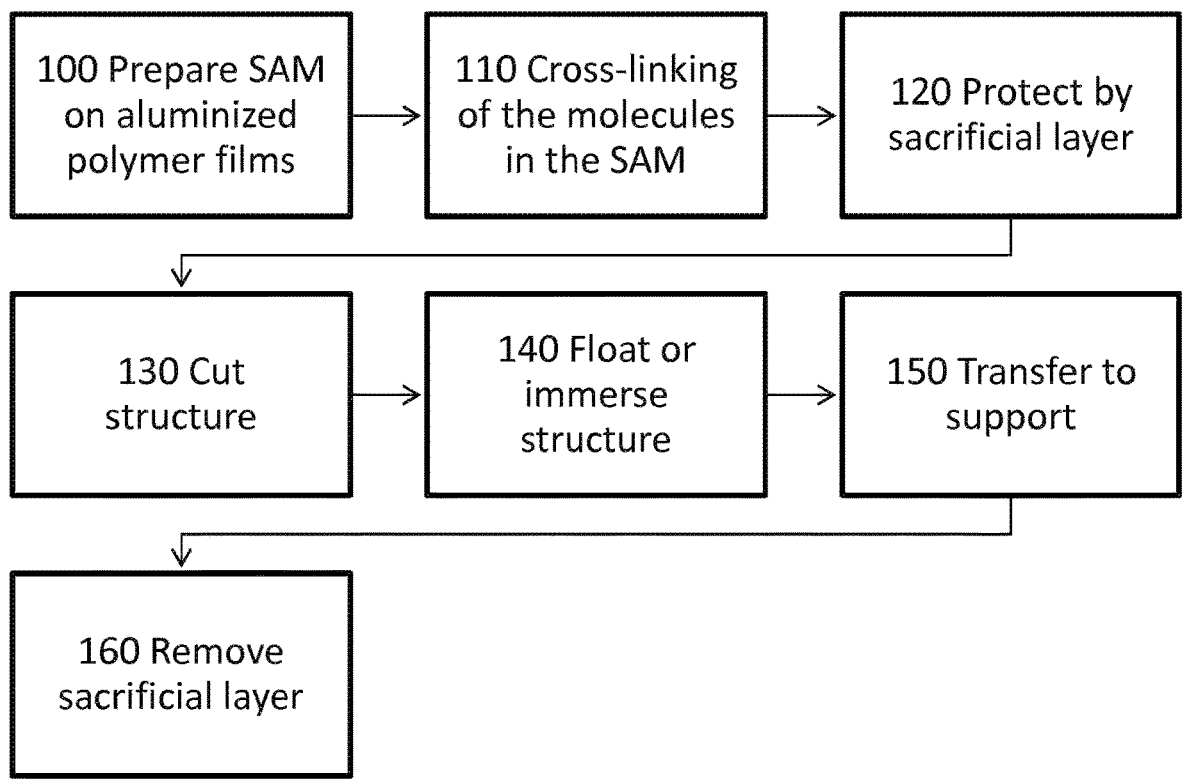
FIG. 1 shows the method for fabrication according to this disclosure

The method for fabrication of the carbon nanomembranes comprises three steps, as shown in FIG. 1.

In a first step 100, a self-assembled monolayer from low molecular aromatic precursor molecules with at least one surface active group is prepared on a substrate of an aluminized polymer foil. The aluminized polymer foil is substantially flat and does not require substantial pre-treatment, unlike the gold layers and the silicon layers known in the art.

The term "low-molecular molecules" means such compounds that are not in an oligomer or polymer form. The term "aromatics" includes the term "heteroaromatics" in this disclosure, i.e. the term "aromatics" means aromatic compounds that contain no heteroatoms or one or more heteroatoms in at least one aromatic ring. Preferably, the aromatic precursor molecules are elected from the group consisting of phenyl, biphenyl, terphenyl, quaterphenyl, naphthalene, anthracene, pyrene, bipyridine, terpyridine, thiophene, bithienyl, terthienyl, pyrrole, and combinations thereof. The aluminized polymer foil could be, but is not limited to, an aluminized polyethylene terephthalate (PET) film.

This preparation is done by wet chemistry (from a solution) or by organic vapour phase deposition of the precursor molecules onto the substrate. The surface-active group can be e.g. phosphonic acids, alcoxysilanes, alcohols or carboxylic acids. The aluminized polymer foil can be substituted by an aluminium foil if the aluminium foil has the necessary low roughness for a homogeneous formation of a self-assembled monolayer.

It would also be possible to use other metallised polymer foils. For example, it would be possible to use gold or silver instead of aluminium. It would be also possible to use films made of other polymers, such as polyethylene, polyester, polypropylene, polycarbonate, nylon, polyimide, polyaramide (aromatic amides), silane- and siloxane-based polymers like polydimethylsiloxane (PDMS), poly (vinyl trimethyl silane) etc., poly (phenylene oxide), polystyrene, poly (4-methyl pentene-1), polysulfone and others. Aluminium has the advantage that it is comparatively inexpensive. The PET is used as the polymer substrate because one can create a polymer substrate with a surface having a small degree of roughness.

The molecules in the self-assembled monolayer are cross-linked in step 110 by irradiation with low energy electrons (10-1000 eV) or by other irradiation to form a carbon nanomembrane.

The carbon nanomembrane is then released from the aluminized polymer film by means of a protective layer. The CNM/ metallised polymer structure formed in step 110 is first coated with a protective layer, e.g. a layer of polymethylmethacrylate (PMMA) or other polymer in step 120 to form a sandwich structure. The coating can be performed by e.g. spin coating, drop casting, electrospinning Then the edges of the protective layer/CNM/metallised polymer sandwich structure are cut in step 130 and the sandwich structure is let to float or is immersed in step 140 into an aqueous sodium hydroxide solution (preferably 5% concentration) at preferably 50° C. or 60° C. temperature. This basic solution of sodium hydroxide etches simultaneously the aluminium film and the PET film, which allows the separation of the protective layer/CNM structure from the substrate. This is advantageous over the prior art, such as that known from Beyer et al, in which the removal of the gold layer from mica needs to be carried out in two steps After the aluminium film is completely etched away, the protective layer/CNM structure floats on the liquid/air interface of the solution and can be optionally transferred to a solid or perforated support in step 150 to create a stack. The support can be of any kind, e.g. a porous polymer, a metallic grid, etc.

In a last step 160, the protective layer can be optionally removed. For example, a PMMA-based protective layer could be dissolved by immersion of the stack in acetone.

It is also known that $CuCl_2$ and KOH can be used as an etchant for the aluminium layer. However, the etching rate is much slower. In the case of $CuCl_2$ the protective layer/CNM structure does not lift easily off the metallised polymer when the polymer is a PET foil. In this case, an additional slight dipping in 1-5% NaOH solution is necessary to promote the separation of the polymer PET layer from the protective layer/CNM.

Should other metals (Au, Ag, Cu) be used, then a different etchant needs to be used. It is thought, for example, that a gold layer could be removed using aqua regia or an iodine solution.

The substrate used in step 100 is flexible and cheap. The role of the substrate is to reduce the material costs and allow upscaling of the production process.

The surface-active group of the aromatic precursor molecules described in this method is a phosphonic acid, which is known to be very stable in air and in water. Therefore, it does not require special equipment, work under inert atmosphere and preliminary drying and degassing of the organic solvent. These phosphorus-based organic compounds have strong chemical affinity towards aluminium, which rules out the necessity of harsh cleaning of the vessels, used for preparation of the self-assembled monolayer.

The solution for the preparation of the self-assembled monolayer can be handled in air. The formation of the self-assembled monolayer happens in shorter time (e.g. less than 6 hours for a biphenyl-based self-assembled monolayer on the aluminized polymer substrate, in comparison to three days for a biphenyl-based self-assembled monolayer on a gold substrate according to the procedure used to date). The formed self-assembled monolayer from step 100 is more stable in ambient environment.

It has been found that unlike prior art methods the solution does not substantially degrade and can be used multiple times.

The process of releasing the carbon nanomembrane from the substrate does not involve hydrofluoric acid.

FIGS. 4A to 4C show the various manufacturing methods. In FIG. 4A a metallised polymer has a self-assembled monolayer placed on top of the metallised polymer film (step 100). The self-assembled monolayer is then irradiated with electrons to form the CNM/metallised polymer structure (step 110).

FIG. 4B shows the subsequent step in which the CNM/metallised polymer structure is coated with a polymer film as the protective layer (step 120) which is then etched to form a protective layer/CNM structure.

In FIG. 4C the protective layer/CNM structure can be left alone (top path), have a support layer attached (step 150, middle path) and/or then the protective layer can be removed (step 160, lower path).

The carbon nanomembranes can be used as ballistic membranes (separation according to the kinetic diameter of the particles) for gas separation and ultrafiltration. It is possible to control properties like the density and size distribution of intrinsic pores (pores formed during the fabrication without additional efforts like treatment of the substrate or formed membranes by e.g. ion bombardment or etching) by the selection of the precursor molecules and process parameters for the formation of the self-assembled monolayer by analogy with the methods described in ACS Nano, Vol. 7, No 8, 6489-6497.

Example

Figure 2:
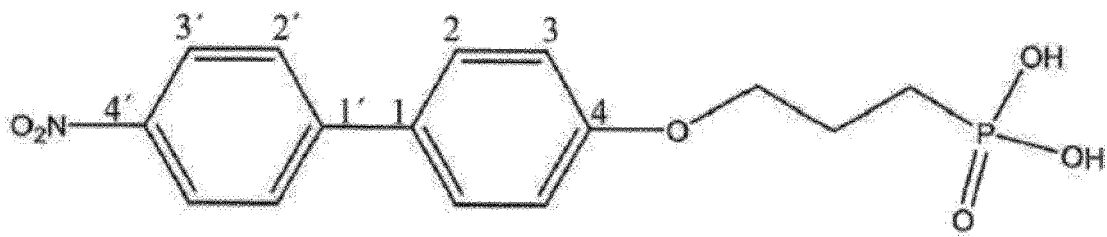
FIG. 2 shows the precursor molecule

Preparation of a self-assembled monolayer of the precursor [3-([4'-Nitro-1,1'-biphenyl]-4-yloxy)-propyl]-phosphonic acid (as shown in FIG. 2) onto an aluminized polyethylene terephthalate film as the substrate with a minimum thickness of the PET film of 75 microns and a thickness of the Al-layer of 14 nm. Preparation was done by immersion of the substrate into a solution of the precursor molecule in technical ethanol.

Crosslinking of the molecules in the self-assembled monolayer by irradiation with low energy electrons (100 eV) with an electron dose of 50 $mC/cm^2$.

Transfer of thus prepared carbon nanomembrane from the aluminized PET foil to a perforated polymer support. The CNM/Al/PET structure is first protected by a protective layer of polymethylmethacrylate (PMMA) attached to the surface by consecutively spin coating of 50 K and 950 K PMMA solutions. Then the edges of the PMMA/CNM/Al/PET sandwich structure were cut and the sandwich structure was immersed into or let to float on an aqueous 5%-NaOH solution at 60° C. temperature. This basic solution etches simultaneously the aluminium film and the PET film, which allows the separation of the PMMA/CNM structure from the substrate. After the aluminium is completely etched away, the PMMA/CNM structure floats on the liquid/air interface and can be transferred to the porous polymer support. In a last step, the sacrificial PMMA-layer is dissolved by immersion of the stack in acetone.

Figure 3A:
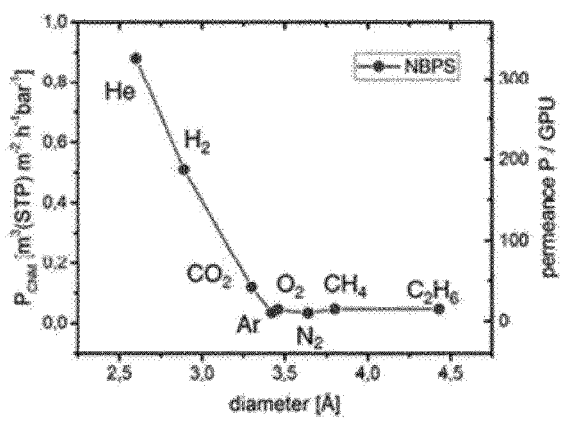
FIG. 3A and FIG. 3B shows the gas separation characteristics of a carbon nanomembrane according to this disclosure (FIG. 3A) and in the prior art (FIG. 3B).
Figure 3B:
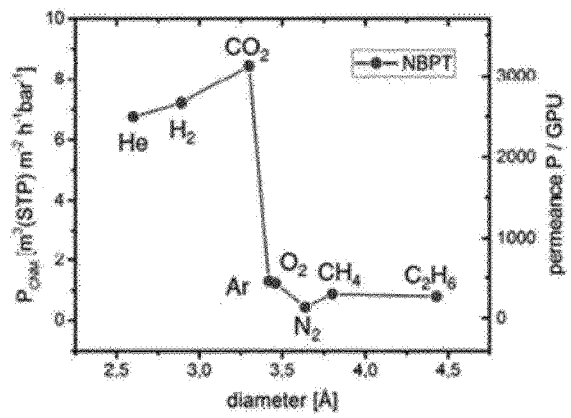

The so prepared composite membrane (FIG. 3A) is very dense with a permeance of hydrogen lower compared to a traditionally prepared carbon nanomembrane (FIG. 3B). FIG. 3B is taken from M. Ai, S. Shishatskiy, J. Wind, X. Zhang, C. T. Nottbohm, N. Mellech, A. Winter, H. Vieker, J. Qiu, K.-J. Dietz, A. Gölzhäuser, A. Beyer, *Carbon Nanomembranes (CNMs) Supported by Polymer: Mechanics and Gas Permeation*, Advanced. Materials 26, 3421 (2014). The cut-off kinetic diameter (gases with a smaller kinetic diameter can pass with high permeance, gases with larger kinetic diameter are hindered) is at around 2.8 Å also the lowest observed so far. This carbon nanomembrane is a starting point for tuning the gas separation characteristic for specific tasks by changing the structure of the precursor molecules to more complex shapes resulting in different packing densities of the self-assembled monolayers and different diameters of the intrinsic pores. This demonstrates that it is possible to form high quality CNMs (without larger pores) from SAMs, which were formed on the non-atomically flat surfaces. This is something which a person knowing the state of the art would not have expected.

What is claimed is:

1. A method for the manufacture of a carbon nanomembrane comprising:
   preparing an aluminised polymer substrate;
   applying on the aluminised polymer substrate a monolayer prepared from an aromatic molecule with at least one phosphonic acid group, wherein the aromatic precursor molecules are selected from the group consisting of phenyl, biphenyl, terphenyl, quaterphenyl, naphthalene, anthracene, pyrene, bipyridine, terpyridine, thiophene, bithienyl, terthienyl, pyrrole, and combinations thereof;
   cross-linking by irradiation of the aromatic molecule to form a carbon nanomembrane;
   protecting the carbon nanomembrane by a protective polymer layer; and
   removing the aluminised polymer substrate.

2. The method of claim 1, further comprising placing of the carbon nanomembrane with the protective polymer layer on a support layer.

3. The method of claim 2, further comprising removal of the protective polymer layer.

4. The method of claim 1, wherein the aluminised polymer substrate is an aluminised polyethylene terephthalate substrate.

5. The method of claim 1, wherein the protective polymer layer is made of polymethylmethacrylate.

6. The method of claim 1, wherein the protective polymer layer is removed in acetone.

7. The method of claim 1, wherein the protective polymer layer is created by electrospinning a porous polymer.

8. A method for the manufacture of a carbon nanomembrane comprising:
   preparing a metallised polymer substrate;
   applying on the metallised polymer substrate a monolayer prepared from an aromatic molecule;
   cross-linking the aromatic molecule to form a carbon nanomembrane;
   protecting the carbon nanomembrane by a protective layer; and
   removing the metallised polymer substrate;
   wherein the protective layer is created by electrospinning a porous polymer.

* * * * *